United States Patent [19]

Todome

[11] Patent Number: 4,937,762

[45] Date of Patent: Jun. 26, 1990

[54] METHOD AND APPARATUS FOR COMBINATION INFORMATION DISPLAY AND INPUT OPERATIONS

[75] Inventor: Tuyoshi Todome, Tokyo, Japan

[73] Assignee: Kabushiki Kaisha Toshiba, Kanagawa, Japan

[21] Appl. No.: 170,429

[22] Filed: Mar. 18, 1988

[30] Foreign Application Priority Data

Mar. 19, 1987 [JP] Japan ................................ 62-66969
Mar. 24, 1987 [JP] Japan ................................ 62-70953

[51] Int. Cl.$^5$ .............................................. G06F 3/033
[52] U.S. Cl. ...................................... 364/521; 340/706; 340/712; 340/286.13; 355/55; 355/243; 358/468
[58] Field of Search ................. 355/133, 14 C, 55, 61, 355/243; 364/518, 521; 340/707, 712, 286 M, 706, 286.13

[56] References Cited

U.S. PATENT DOCUMENTS

| | | | |
|---|---|---|---|
| 4,393,375 | 7/1983 | Sugiura et al. ...................... | 364/518 |
| 4,413,314 | 11/1983 | Slater et al. ........................ | 340/712 |
| 4,559,519 | 12/1985 | Matsumoto et al. .............. | 340/286 M |
| 4,631,577 | 12/1986 | Yamanishi ........................... | 358/75 |
| 4,639,881 | 1/1987 | Zingher ............................... | 340/712 |
| 4,682,158 | 7/1987 | Ito et al. ............................. | 355/133 |
| 4,896,223 | 1/1990 | Todome ............................... | 358/468 |

FOREIGN PATENT DOCUMENTS 61-126643 5/1961 Japan .
62-284419 12/1987 Japan .

*Primary Examiner*—Gary V. Harkcom
*Assistant Examiner*—Raymond J. Bayerl
*Attorney, Agent, or Firm*—Finnegan, Henderson, Farabow, Garrett, and Dunner

[57] ABSTRACT

A display and input device (22) is used in a combination equipment incorporating, for example, a copier (120), a facsimile (130), a printer (140) or a scanner (150) having a independent operational functions. This display and input device comprised of a transparent touch panel having flat display is designed so that the picture image information is displayed step by step by the display unit. When the combination apparatus is operated and the picture image operations are executed, the required information for such operations is displayed step by step, permitting the simple checking of input information and correct execution of the desired operation.

8 Claims, 9 Drawing Sheets

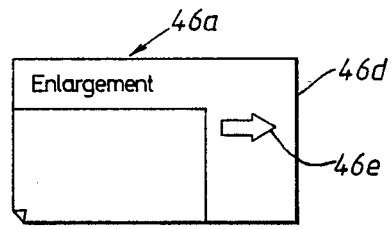
FIG.7A.
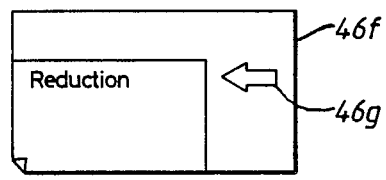
FIG.7B.
| | COPY PAPER | | | |
|---|---|---|---|---|
| | B5 | A4 | B4 | A3 |
| ORIGINAL DOCUMENT B5 | 100 100 | 115 | 141 | |
| A4 | 86 | 100 100 | 122 | 141 |
| B4 | 70 | 81 | 100 100 | 115 |
| A3 | | 70 | 86 | 100 100 |
FIG.8.

METHOD AND APPARATUS FOR COMBINATION INFORMATION DISPLAY AND INPUT OPERATIONS

BACKGROUND OF THE INVENTION

1. Field of the Invention

This invention relates to information display and input apparatus and, more precisely, to combined display and input devices which are used for combination equipment incorporating a plurality of information processing modules having independent operation modes, such as copiers and facsimiles.

2. Discussion of Background

In the past, electronic equipment which processes picture image information for multiple purposes or functions, such as copying and printing, was assembled and used as a group of discrete and independent devices. However, with current advances in technology, combination equipment which incorporates these multiple functions is now coming into practical use.

However, in such combination equipment, the construction of a unit for inputting operation information and a display device for exhibiting output information becomes complex and diverse, since a number of differing types of functions are combined in a single piece of equipment.

Most conventional combined display and input devices constituting control panels for executing input operations for such combination equipment were constructed by combining a button-key system input unit having a number of rows of button-keys with a display unit which uses liquid crystals or LEDs for displaying operation information.

Moreover, in the copy mode of an apparatus using this type of control panel, problems occur when executing magnification alteration operations such as enlargement and reduction of the picture image to be copied. Conventional display devices display the magnification alteration information accompanying these operations by characters (e.g. 120%, 80%) or the like. Such magnification alteration information is easily misread. As a result, copy paper is wasted due to operating errors such as executing a reduction operation when an enlargement operation was desired, and vice versa.

This type of problem occurs not only in the copy mode, but also in other operations, such as printing, which also employs a magnification alteration operation.

As described above, conventional equipment employs display and input devices having many input keys and wide area for displaying many kinds of information. It is thus difficult to accurately check the operation information being supplied as input. Also, misunderstanding easily occurs in the display mode such that magnification alteration information operation errors are likely to occur, resulting in losses.

CROSS REFERENCE TO RELATED APPLICATION

The subject matter of this invention is related to the subject matter disclosed in copending U.S. patent application Ser. No. 07/042,025 filed Apr. 24, 1987 by Kunihiro Shibuya and Tuyoshi Todome, assigned to the assignee of this invention, and claiming priority based on Japanese application Ser. No. 61-126643 filed May 31, 1986.

SUMMARY OF THE INVENTION

An object of this invention is to provide a display and input device which enables the operator to accurately recognize operation information displayed by the display unit and to provide an economical means of preventing operating errors.

Additional objects and advantages of the invention will be set forth in part in the description which follows, and in part will be obvious from the description, or may be learned from practice of the invention. The objects and advantages of the invention may be realized and attained by means of the instrumentalities and combinations particularly pointed out in the appended claims.

The present invention overcomes the problems and disadvantages of the prior art by providing information display and input apparatus for use with combination equipment including a plurality of information processing modules having independent operation modes. The apparatus comprises a display unit having a display surface defined by X,Y coordinates for displaying graphic display images associated with the operation modes; an input unit having an input surface corresponding to the display surface and defined by the X,Y coordinates, the input unit being responsive to touch inputs at the input surface to generate electrical signals corresponding to the X,Y coordinates of the touch input; a memory for storing a plurality of control programs associated with the information processing modules; the control programs including instructions defining the operation modes and graphic display images of the apparatus, defining control signals for the information processing modules corresponding to the operation modes, and defining predetermined X,Y coordinates of the input unit which represent valid input signals for the operation modes; and controller means connected to the display unit, the input unit, and the memory for executing the instructions to generate the graphic display images, to set up the predetermined X,Y coordinates of the input unit, to respond to the electrical signals generated by touch inputs applied to the predetermined X,Y coordinates, and to supply the control signals to operate the information processing modules according to the operation modes.

In another aspect, the invention provides a method for generating control signals for combination equipment including a plurality of information processing modules having independent functions, the information processing modules including a plurality of operation modes. The method comprising the steps of loading an initial program from memory associated with an information processing module; generating a first graphic display image on a display device defined by the loaded program; responding to a touch input exclusively at a first position on an input device superposed with the display device, the first position being defined by X,Y coordinates associated with the first graphic display image, by loading a subsequent program from memory associated with a second information processing module of the equipment; generating a second graphic display image defined by the subsequent program; and responding to a touch input exclusively at a second position on the input device defined by the subsequent program, the second position being defined by X,Y coordinates associated with the second graphic display image, by generating a third graphic display image and by generating control signals to the associated information processing module to execute an operation mode.

The accompanying drawings, which are incorporated in and constitute a part of this specification, illustrate embodiments of the invention, and, together with the description, serve to explain the principles of the invention.

BRIEF DESCRIPTION OF THE DRAWINGS

FIGS. 7A and 7B are illustrations similar to FIGS. 6A and 6B showing modifications of the graphic display image in the Picture Image Magnification display section of the Magnification mode field;

FIG. 8 is a table showing the magnification factors of original document sizes and copy paper sizes for the magnification alteration operation;

DETAILED DESCRIPTION OF THE PREFERRED EMBODIMENT

Figure 1:
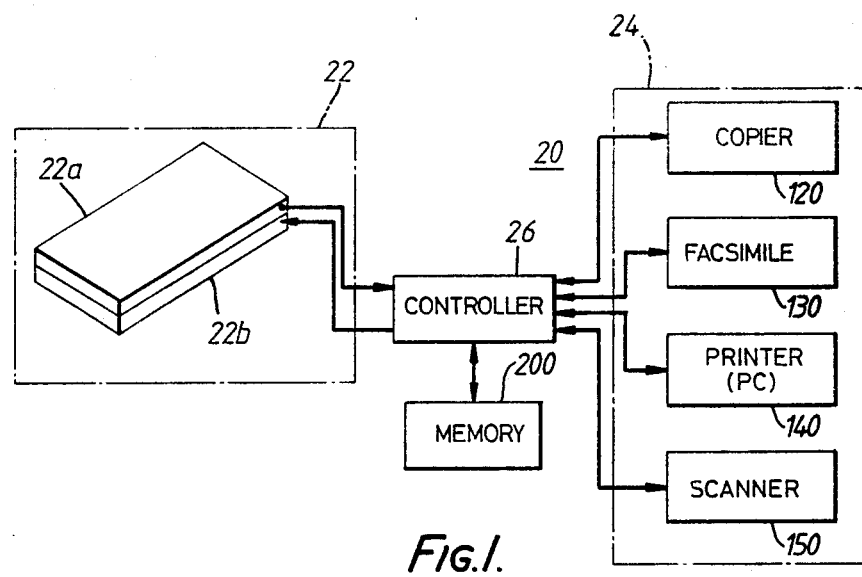
FIG. 1 is a block diagram showing the construction of combination equipment which includes an embodiment of this invention.

A display and input device which constitutes a first embodiment of the present invention will now be described with reference to the accompanying drawings. Combination equipment 20 shown in FIG. 1 is constructed to include the following items: a combined display and input device 22 which is composed of and incorporates a transparent touch panel 22a, which is a rectangular input unit, and a flat display unit 22b, which is a display unit upon which transparent touch panel 22a is superposed; a combined function unit 24; a memory 200 in which are pre-stored control programs defining the display areas and input areas for the various modes in combined display and input device 22 and the operation program which carries out operational control of combined function unit 24; and a controller 26 which loads the control programs from memory 200 and acts as a control device for setting the key input areas for transparent touch panel 22a of combined display and input device 22 and transmitting the key input signals and, at the same time, for executing the various graphic display images (described below) for flat display 22b. Controller 26 may be, for example, a type 80C88 CMOS device commercially available from the Oki Electric Industry Co. Ltd.

Combined function unit 24 includes a plurality of information processing modules including a copier 120, facsimile 130, a printer 140, and a scanner 150. Information processing modules 120, 130, 140 and 150 have a plurality of independent operation modes, such as copy enlargement, copy reduction, facsimile transmission, facsimile reception, etc. Thus, combination equipment 20 constitutes a single piece of apparatus which can perform the functions of copying, facsimile transmission and reception, printing, and scanning.

Display unit 22b is composed of a conventional flat panel display surface, such as a liquid crystal display (LCD), a plasma display (PDP), a light-emitting diode display (LED), an electroluminescent display (ELD), and an electrostatic memory projection type display (ECD). It is also possible to use a CRT display. The display surface of display unit 22b is defined by X,Y coordinates and supplies graphic display images associated with the operating modes of combination equipment 20.

Transparent touch panel 22a may employ any of various detection systems, such as an optical system, a transparent conductive film (resistor film) system, a capacitance system, or a pressure system. As described below, it is designed to be sensitive to touches of the operator's fingers at various locations of panel 22a, to interpret such touch inputs as key input signals, and to transmit such key input signals to controller 26. Touch panel 22a includes an input surface corresponding to and superposed above the display surface of display unit 22b. The input surface is also defined by the X,Y coordinates and is responsive to touch inputs to generate electrical signals corresponding to the X,Y coordinates of the touch input. In the preferred embodiment, combined display and input device 22 is a display and input combination panel described more completely in U.S. patent application Ser. No. 07/042,025 filed Apr. 24, 1987. The disclosure of this copending U.S. Application is hereby expressly incorporated by reference.

Figure 2:
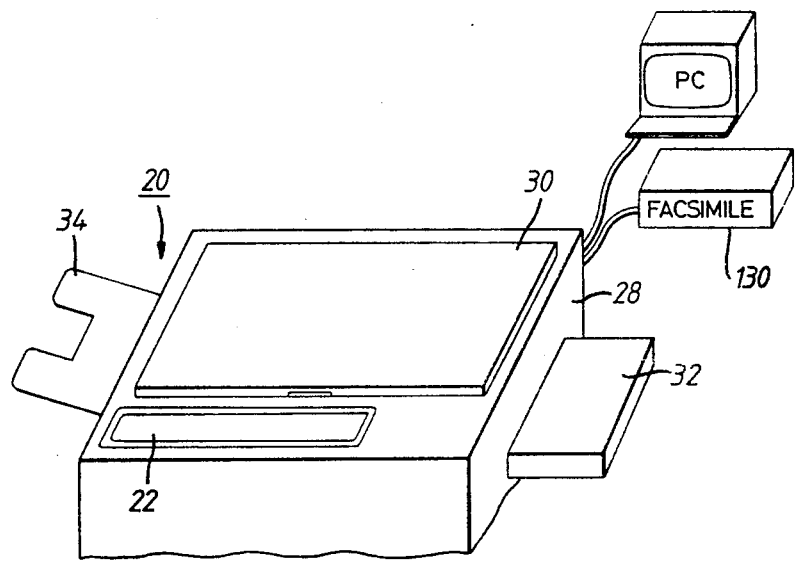
FIG. 2 is a perspective view of a portion of the combination equipment shown in FIG. 1.

As shown in FIG. 2, controller 26, combined function unit 24 and memory 200 are housed in cabinet 28. Combined display and input device 22 is installed at one corner of cabinet 28 in combined form, with transparent touch panel 22a on top and flat display 22b below. Cabinet 28 includes a cover 30, a paper supply cassette 32, and a paper dispense tray 34. Memory 200 stores a plurality of control programs associated with the information processing modules, the control programs including instruction defining the operation modes and graphic display images of the apparatus, defining the control signals for the information processing modules corresponding to the operation modes, and defining predetermined X,Y coordinates of the input unit which represent valid input signals for the operation modes.

Next, the operation of combination equipment 20 with the above construction will be described, focusing mainly on the various display modes in combined display and input device 22 and the setting modes of the key input positions which correspond to these graphic display images.

Figure 3:
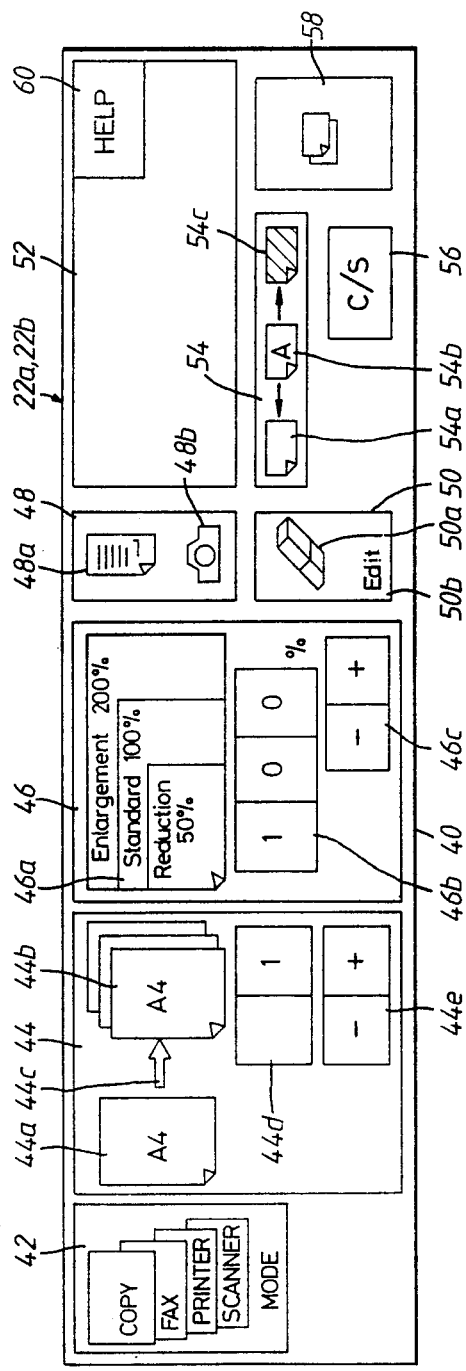
FIG. 3 is a plan view of a control panel of the combination equipment of FIGS. 1 and 2, showing the graphic display image for the Copy Mode of the combination equipment.
Figure 4:
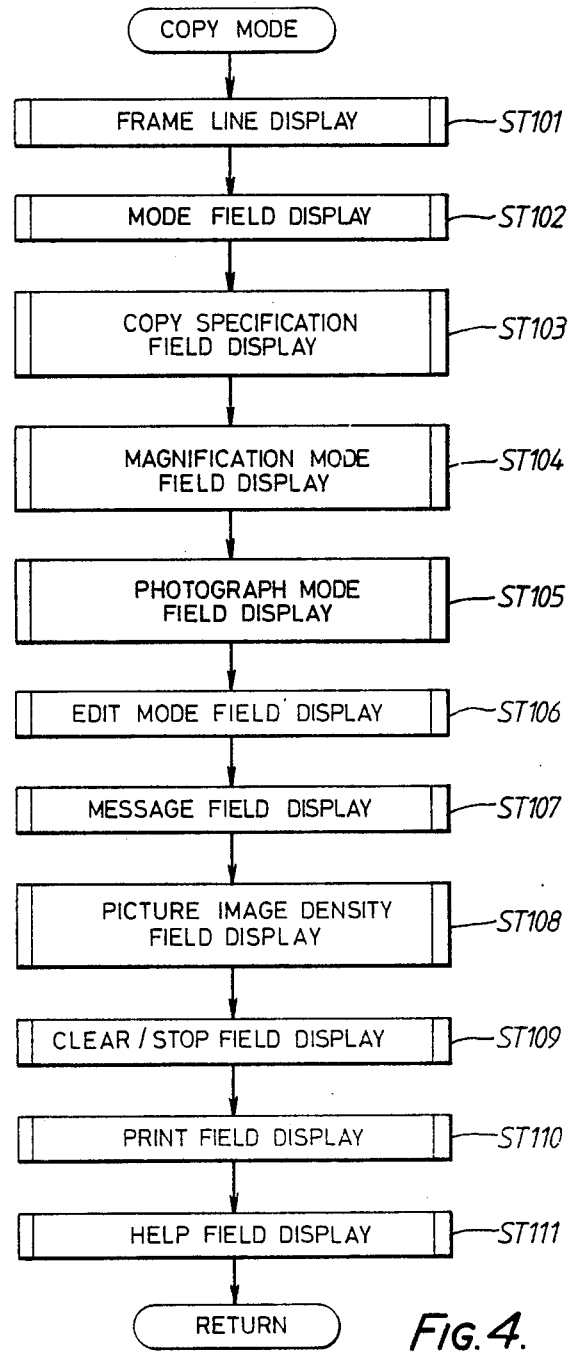
FIG. 4 is a flow chart of the Copy Mode of the combination equipment of FIGS. 1–3.

When combination equipment 20 is started, controller 26 loads the initial mode control program which is stored in memory 200. For example, if combination equipment 20 is set with the Copy Mode (COPY) as the initial mode, as commanded by an operator input to touch panel 22a, the content of the control program shown in FIG. 4 is loaded and, on the basis of this, display signals are sent to flat display 22b. The display information and key input positions for the Copy Mode (COPY) are then displayed as a graphic display image on device 22 as shown in FIG. 3.

That is to say, first, frame line (border) 40 (FIG. 3) is displayed on flat display 22b (FIG. 4), and then Mode field 42 is displayed in the left corner of frame line 40 (ST102). Mode field 42 is composed of the characters for mode (MODE) and four rectangular frames which are superimposed but slightly shifted in relation to each other. In these superimposed frames, the characters for copy (COPY), facsimile (FAX), printer (PRINTER), and scanner (SCANNER) are displayed in that order, starting from the top. Also, controller 26 sets a touch area for the whole area of Mode field 42. That is, controller 26 will respond with a predetermined control function if electrical signals are generated by a touch input within the X,Y coordinates defining the portion of touch panel 22 directly below Mode field 42 of display panel 22b.

Next, controller 26 displays Copy Specification field 44 immediately to the right of Mode field 42 (ST103). The following items are displayed in Copy Specification field 44, as shown in FIG. 3: —Original Document Size 44a in the upper lefthand side (for example, the characters A4 are displayed to represent the standard A4 size of paper); Copy Paper Size 44b representing the size of paper to be used for copying, on the upper righthand side; arrow sign 44c between Original Document Size 44a and Copy Paper Size 44b and Number of Copies display section 44d below Copy Paper Size 44b.

Input keys 44e for the number of copies are also displayed as, for instance, plus (+) for increasing the number of copies and minus (−) for decreasing the number of copies, both of approximately 5×5 mm, beneath Number of Copies display section 44d. It is to be noted that touch panel 22a generates electrical signals when touched anywhere within its borders. These signals contain information specifying the X,Y locations of the touch input. Controller 26, under control of programs from memory 200 will execute predetermined control functions exclusively upon receipt of those signals from touch panel 22a indicating a touch input within predefined X,Y coordinate locations. Controller 26 is thus, exclusively "sensitized" to touch inputs within such predefined location, and will ignore touch inputs at other locations. At various times, the sensitized areas are changed, under program control.

Controller 26 also displays Magnification Mode field 46 immediately to the right of Copy Specification field 44 (ST104).

In Magnification Mode field 46 are respectively displayed Picture Image Magnification display section 46a at the top, Magnification Number display section 46b in the center, and Magnification input keys 46c at the bottom.

Next, controller 26 displays Photograph Mode field 48 positioned on top with Edit Mode field 50 below, immediately to the right of Magnification Mode field 46.

In Photograph Mode field 48, Document 48a and Camera 48b are displayed (ST105). Also, in Edit Mode field 50, mark 50a and the characters for edit (EDIT) 50b are displayed (ST106).

Also controller 26 displays Message field 52 and Picture image Density field 54 immediately to the right of Photograph Mode field 48 and Edit Mode field 50.

Message field 52 is a rectangular shape designed to be displayed in the top righthand corner of flat display 22b (ST107).

In a Picture Image Density field 54, Light Copy display section 54a, Automatic display section (with the character A) 54b, Dark Copy display section 54c (shown by diagonal shading) and two arrows are displayed (ST108).

Next, controller 26 displays Clear/Stop (C/S) field 56 with a height of approximately 5 mm and a width of at least 5 mm beneath Picture Image Density field 54 (ST109).

Also, controller 26 displays Print field 58, shown by a graphic of copy paper, beneath Message field 52 in the lower righthand corner of flat display 22b (ST110). At the same time, it displays the Help (HELP) field 60 in the upper righthand corner of Message field 52 (ST111).

At the same time as displaying the various fields on flat display 22b, controller 26 also sensitizes touch areas of touch panel 22a based on the control program by setting up to exclusively respond to touch inputs at predetermined X,Y coordinate locations. Controller 26 sensitizes touch areas for the following: the areas for Copy Paper Size 44b and Number of Copies input keys 44e in Copy Specification field 44; the areas of Magnification input keys 46c of Magnification Mode field 46; the whole area of Photograph Mode field 48; the whole area of Edit Mode field 50; the whole of Help field 60; the areas of Light Copy display section 54a, Automatic display section 54b and Dark Copy display section 54c in Picture Image Density field 54; the whole area of Clear/Stop field 56; and the whole area of Print field 58.

• Therefore, touch inputs to areas of transparent touch panel 22a other than the various areas described above will not result in control action by controller 26. In this way the setting of the display of the various fields for flat display 22b and the touch areas for transparent touch panel 22a is executed.

The invention thus includes controller means connected to the display unit, the input unit, and the memory for executing the instructions to generate the graphic display images, to set up the predetermined X,Y coordinates of the input unit, to respond to the electrical signals generated by touch inputs applied to the predetermined X,Y coordinates, and to supply the control signals to operate the information processing modules according to the operation modes. As embodied herein, the controller means comprises controller 26.

The magnification alteration operation in Magnification Mode field 46 will now be explained in detail with reference to FIGS. 5 to 8.

Figure 5A:
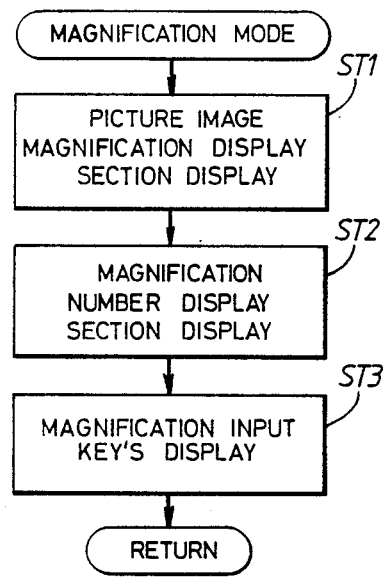
FIGS. 5A and 5B are flowcharts of a program defining the display of the Magnification Mode field in the Cop Mode.
Figure 5B:
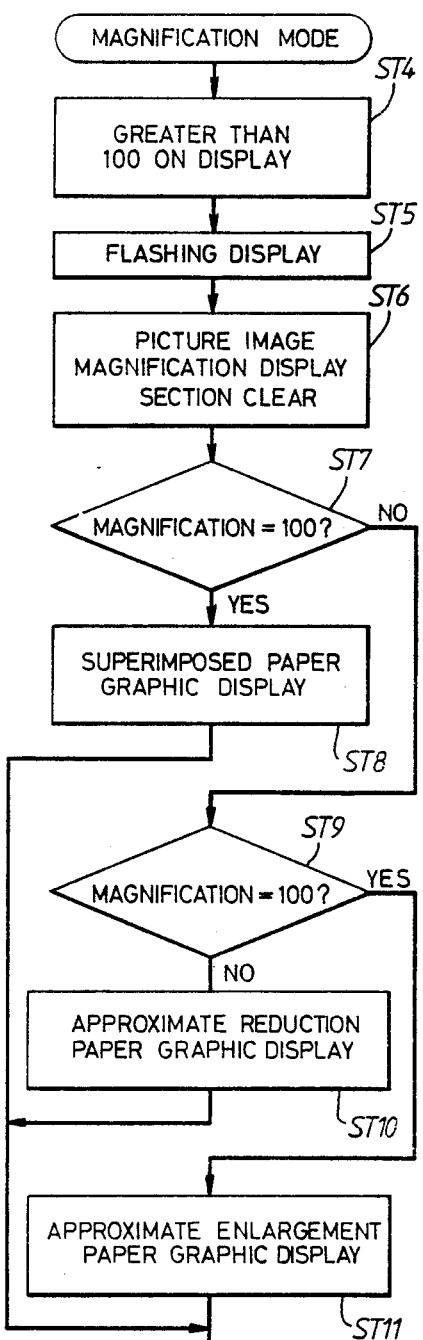

Based on the control programs shown in FIGS. 5A and 5B, controller 26 first displays the following respectively in Magnification Mode field 46 (ST1, ST2, ST3): —Picture Image Magnification display section 46a in the top part; Magnification Number display field 46b in the center; and Magnification input keys 46c, showing plus (+) and minus (−), in the bottom part.

As the initial screen for Picture Image Magnification display section 46a, three superimposed paper graphics representing reduction (Reduction: for example, 50%), standard (Standard: for example 100%), and enlargement (Enlargement: for example, 200% are displayed, as shown in FIG. 3. In this case, the Standard paper graphic is displayed as white on a black background (hereafter this is called "reverse display"), and the paper graphics for reduction and enlargement are displayed as black on a white ground.

Moreover, a 3-digit (initial value 100) figure is displayed T in Magnification Number section 46b.

Figure 6A:
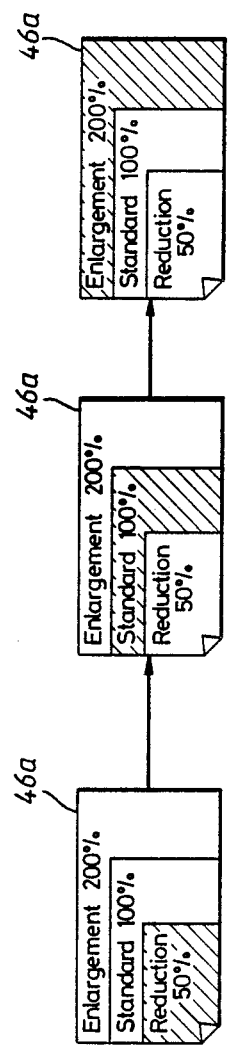
FIG. 6A is an illustration of a portion of the control panel of FIG. 3 showing the graphic display image for the magnification enlargement operation of the Picture Image Magnification display section in the Copy Mode.

When the operator touches the plus (+) side in Magnification input keys 46c to obtain an enlarged picture image, a 3-digit Magnification number of more than 100 is displayed (ST4). Controller 26, as shown in FIG. 6A which shows three paper graphics in a superimposed state, first displays the reduction paper graphic in reverse as white on a black background (shown by the diagonal shading in the lefthand column of FIG. 6A) and, at the same time, displays the standard and enlargement paper graphics in black on a white background. Next controller 26 displays the standard paper graphic in reverse, as in the center column of FIG. 6A and, at the same time, displays the reduction and enlargement paper graphics in black on white. Then controller 26 displays the enlargement paper graphic in reverse, as shown in the righthand column of FIG. 6A and, at the same time, displays the reduction and standard paper graphics in black on white.

In this way, since the graphic display image of Picture Image Magnification display section 46a is displayed with a flashing movement in the order Reduction—Standard—Enlargement (ST5), the operator can accurately recognize that a magnification alteration operation for obtaining an enlarged picture image has been commanded.

During the execution of the above graphic display image in Picture Image Magnification display section 46a, controller 26 clears the figures in Magnification Number display section 46b.

After this, the screen of Picture Image Magnification display section 46a is completely cleared (ST6). Since at this time the magnification percentage is more than 100% (ST7, ST9), controller 26 displays Approximate Enlargement Paper graphic 46d in Picture Image Magnification display section 46a, as shown in FIG. 7A, based on the control program shown in the flowchart in FIG. 5B (ST11). FIG. 7A shows that a graphic display image is generated which simultaneously represents the relative sizes of the original image and the size to which the image is to be changed.

Approximate Enlargement Paper graphic 46d is displayed in black taking the minimum paper graphic as a reference and superimposing an approximate enlargement paper graphic to indicate the approximate degree of enlargement which has been commanded. Arrow 46e is also displayed in white.

Figure 6B:
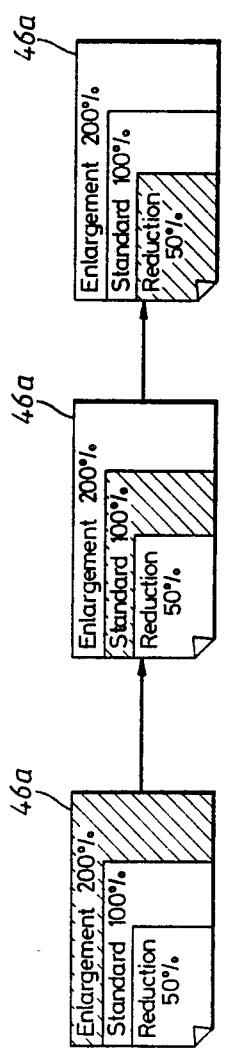
FIG. 6B is an illustration similar to FIG. 6A showing the graphic display image for the magnification reduction operation of the Picture Image Magnification display section in the Copy Mode.

On the other hand, when the operator touches the minus (−) side in the Magnification input keys 46c to obtain a reduced picture image, controller 26, as shown in FIG. 6B which shows three paper graphics in a superimposed state, first displays the enlargement paper graphic in reverse as white on a black background (shown by the diagonal shading in the lefthand column of FIG. 6B) and, at the same time, displays the standard and reduction paper graphics in black on a white background. Next, controller 26 displays the standard paper graphic in reverse, as in the center column of FIG. 6B, and at the same time, displays the reduction and enlargement paper graphics in black on white. Finally, controller 26 displays the reduction paper graphic in reverse, as shown in the righthand column of FIG. 6B, and at the same time displays the enlargement and standard paper graphics in black on white.

In this way, since the graphic display image of Picture Image Magnification display section 46a is displayed with a movement in the order Enlargement—Standard—Reduction (ST5), the operator can accurately recognize that a magnification alteration operation for obtaining a reduced picture has been commanded.

During the execution of the above graphic display image in picture Image Magnification display section 46a, controller 26 clears the figures in Magnification Number display section 46b.

After this, the screen of Picture Image Magnification display section 46a is completely cleared (ST6).

Since at this time the magnification percentage is less than 100% (ST7, ST9), controller 26 displays Approximate Reduction Paper graphic 46f in Picture Image Magnification display section 46a, as shown in FIG. 6B, based on the control program shown in the flow chart in FIG. 5B (ST10). Approximate Reduction Paper graphic 46f is displayed in black taking the minimum paper graphic as a reference and superimposing an approximate reduction paper graphic. Arrow 46g is also displayed in white. This graphically indicates to the operator that a reduction operation has been commanded, but that at the present time the copied image, if performed now, would be larger than the original.

FIG. 8 is a table showing magnification factors of original document sizes and copy paper sizes. The figures in each column of FIG. 8, the relative proportions of which are determined by the relationship between the original document size and the copy paper size (for instance, the magnification in the case of a B5 original document and A4 size copy paper is "115"), are displayed in Magnification display section 46b for both the enlargement operation and the reduction operation.

Moreover, in the magnification alteration operation, when magnification is not needed, that is to say when the magnification is 100% (ST7), the three superimposed paper graph are displayed in Picture Image Magnification display section 46a in the same way as in the initial screen shown in FIG. 3 (ST8).

The invention in a second aspect thus includes controller means connected to the display unit, the input unit, and the memory for responding to a touch input within the predetermined X,Y coordinates associated with the operation mode in which the size of an image is changed and for executing instructions in the program corresponding to the operation mode in which the size of an image is changed to sequentially generate a series of the graphic display images representing the manner in which the size of the image is to be changed.

Preferably, in the second aspect, the controller means comprises means for generating a first series of graphic display images comprising a sequence of a reduction image, a standard image, and an enlargement image when an enlargement of a picture image is specified by a touch input, and a second series of graphic display images comprising a sequence of an enlargement image, a standard image, and a reduction image when a reduction of a picture image is specified by a touch input.

In a third aspect, the invention includes controller means connected to the display unit, the input unit, and the memory for responding to a touch input within the predetermined X,Y coordinates associated with the operation mode in which the size of an image is changed and for executing instructions in the program corresponding to the operation mode in which the size of an image is changed to generate a graphic display image representing the degree in which the size of the image is to be changed.

Preferably, in the third aspect, the controller means comprises means for executing instructions in the program corresponding to the operation mode in which the size of an image is changed to generate a graphic display image simultaneously representing the relative sizes of the original image and the size to which the image is to be changed.

As embodied herein, the controller means comprises controller 26 executing instructions of the program shown in FIG. 5B.

Figure 9:
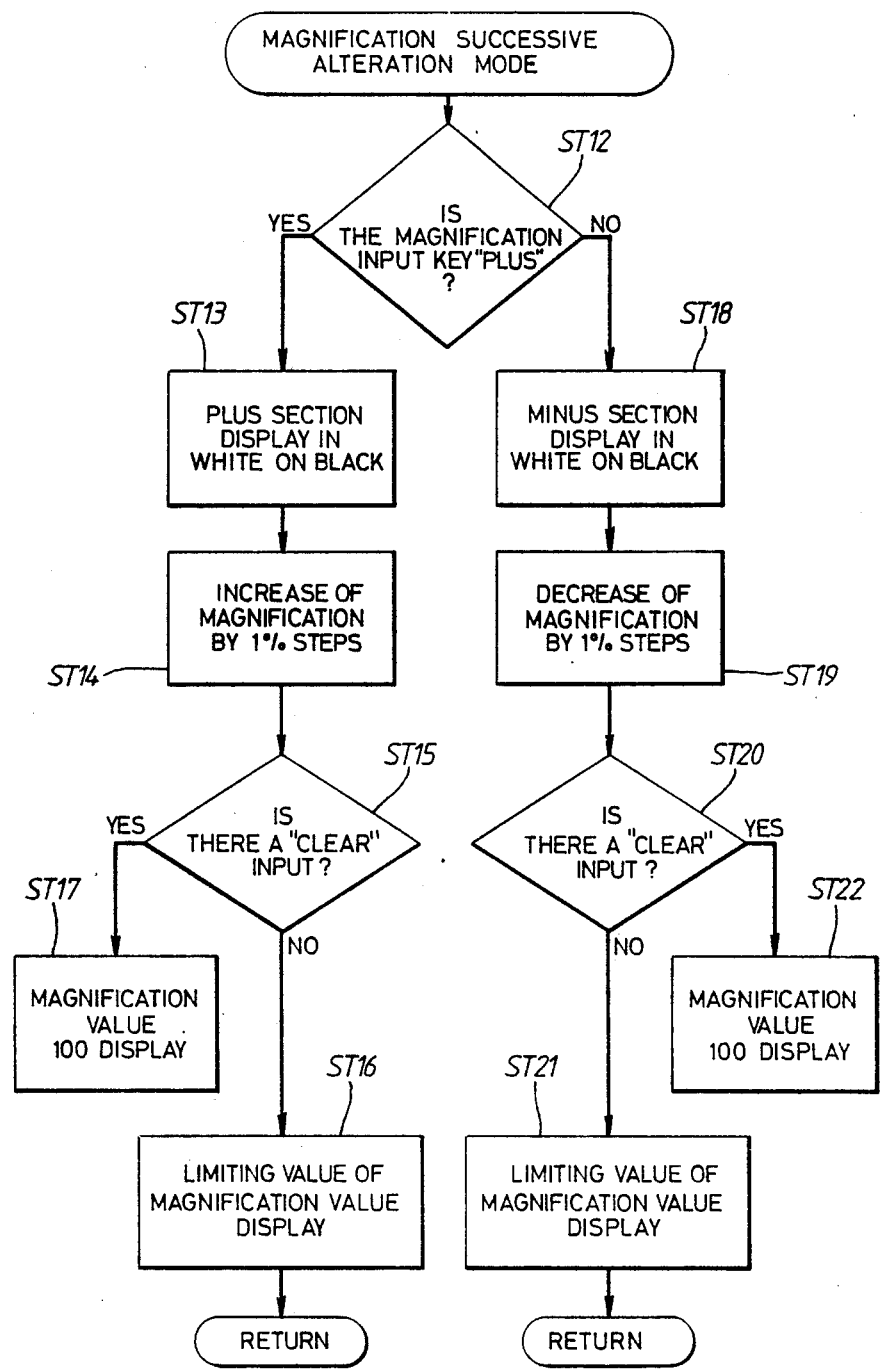
FIG. 9 is a flowchart of a program defining the display of the Magnification Mode field when the magnification alteration operation is executed successively.

Next, in the magnification alteration operation, the operation in the case of successive increase or decrease from a 100% magnification is explained with reference to FIG. 9.

When the operator executes an input operation on the plus side of Magnification input key 46c (ST12), controller 26 displays the plus section in reverse as white on a black background (ST13) and, at the same time, for every input operation by the operator, the figure in Magnification Number display section 46b is successively increased by 1%, for example, 101, 102, 103, ... (ST14). Then, when this figure reaches the limiting value determined by the function of copier 120 in combination equipment 20 (for example, 200%), this limiting value is displayed in Magnification Number display section 46b as it stands, even though the input operation by the operator continues (ST16).

If the operator performs an input operation in Clear/Stop field 56 while the magnification number is increasing (ST15), controller 26 returns the figure in Magnification Number display section 46b to "100" (ST17).

When the operator executes an input operation on the minus (−) side of Magnification input key 46c (ST12), controller 26 displays the minus (−) section in reverse as white on a black background (ST18) and, at the same time, for every input operation by the operator, the figure in Magnification Number display section 46b is successively decreased by 1%, for example, "99", "98", "97", ... (ST19).

Then, when this figure reaches the limiting value determined by the function of copier 120 in combination equipment 20 (for example, 50%), this limiting value is displayed in Magnification Number display section 46b as it stands, even though the input operation by the operator continues (ST21).

If the operator performs an input operation in Clear/Stop field 56 while the magnification number is decreasing (ST20), controller 26 returns the figure in Magnification Number display section 46b to "100" (ST22).

Figure 10:
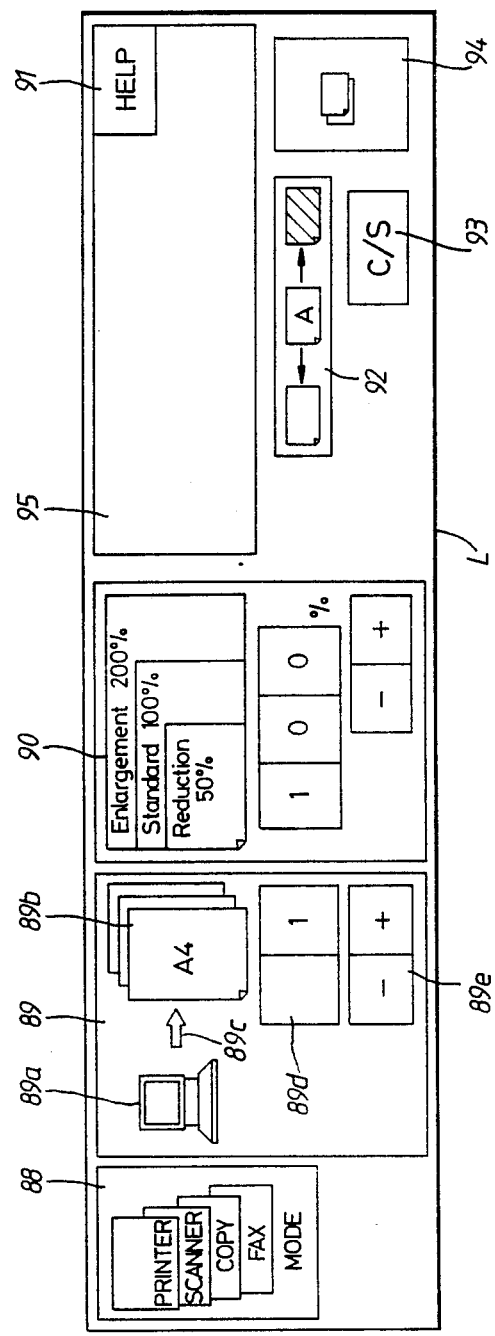
FIG. 10 is a plan view similar to FIG. 3 showing the Printer Mode in the embodiment device.

Next, the Printer Mode will be explained with reference to FIG. 10. In this case, Mode field 42 is touched twice in the Copy Mode graphic display image shown in FIG. 3.

Then, controller 26 displays frame line 40 after first completely clearing the Copy Mode display shown in FIG. 3 and each touch area.

After this, controller 26 displays Mode field 88 of the same size as, and with a similar arrangement to, Mode field 42 and also sets a touch area for Mode field 88. At this time controller 26 executes display control so that the frame with the characters PRINTER is uppermost, as shown in FIG. 10.

Next, controller 26 displays a Printer Specification field 89 in the position of Copy Specification field 44 shown in FIG. 3 and also sets touch areas in the required positions in Printer Specification field 89.

That is to say, in Printer Specification field 89, the following items are respectively displayed: Personal Computer (hereafter PC) graphic 89a instead of Original Document Size 44a in Copy Specification field 44; Printer Paper Size 89b, similar to Copy Paper Size 44b in the position of Copy Paper Size 44b; arrow 89c at the position of arrow 44c; Number of Prints display section 89d at the position of Number of Copies display section 44d; and Number of Prints input keys 89e similar to, and in the position of, (+) and (−) Number of Copies input keys 44e.

At the same time, controller 26 sets touch areas in Number of Prints input keys 89d.

Furthermore, controller 26 sets displays and touch areas for Magnification Mode field 90, which has the same graphic display image and the same touch areas as Magnification Mode field 46, alongside Printer Specification field 89. Here, for simplification of explanation, symbols are displayed in each field within Magnification Mode field 90 which are identical to those shown in FIG. 3.

Next, after displaying Message field 95 in the area from next to Magnification Mode field 90 to the vicinity of line 40 on the right-hand edge of transparent touch panel 22a and flat display unit 22b, controller 26 executes the display of the following items: Help field 91; Picture Image Density field 92; Clear/Stop field 93; and Print field 94, with the same sizes and arrangements as Help field 60, Picture Image Density field 54, Clear/Stop field 56 and Print field 58 shown in FIG. 3. Also, controller 26 executes the setting of the respective touch areas where necessary.

The magnification alteration in Magnification Mode field 90 of the Printer Mode is also executed in the same way as in the case of the magnification alteration operation in the Copy Mode described above.

This invention is not limited to the embodiment described above, and various types of modification are possible within the limits of the essential points.

Figure 11A:
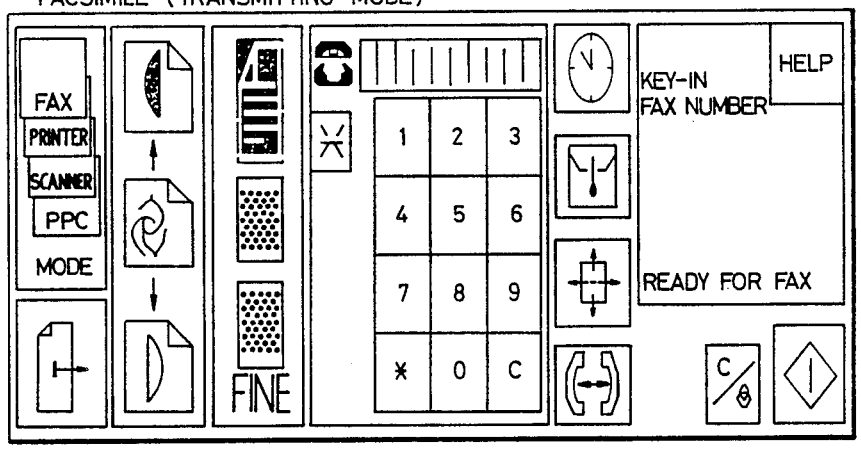
FIGS. 11A and 11B are respectively plan views similar to FIGS. 3 and 10 showing the graphic display image for the Facsimile Mode in the embodiment device.
Figure 11B:
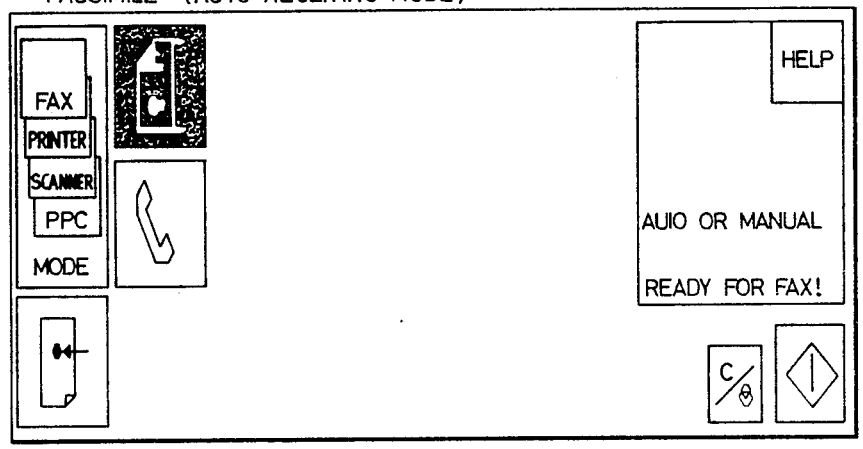
Figure 12:
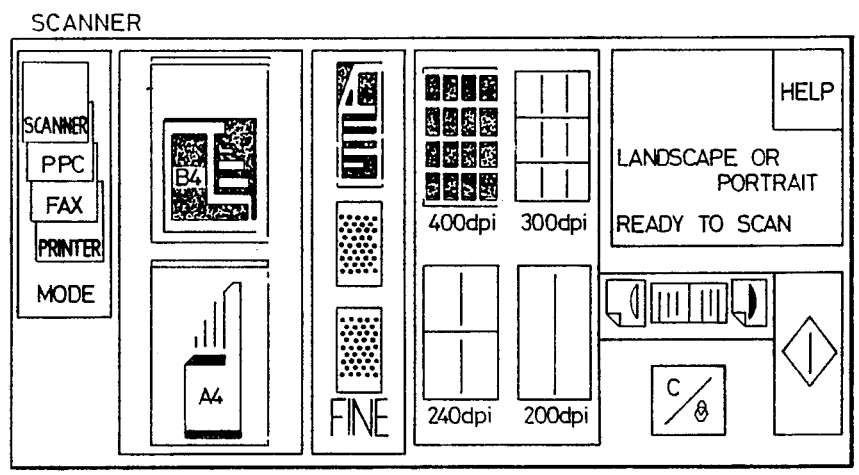
FIG. 12 is a plan view similar to FIGS. 3, 10, and 11 showing the graphic display image for the Scanner Mode in the embodiment device.

For example, in the embodiment described above, the case of the Copy Mode and the Printer Mode were explained in detail. However, combination equipment 20 may also be operated in a facsimile mode and in a scanner mode. The Facsimile Mode display is shown in FIG. 11A, with a primary control panel image of the facsimile transmitting operation mode, and in FIG. 11B, with a primary control panel image of the facsimile receiving operation mode. The Scanner Mode display is shown in FIG. 12. By executing the setting of the graphic display images and touch areas relevant respectively to facsimile and scanner functions, these respective functions can also be performed.

The invention, as described in detail above, provides an operation guide by generating a graphic display image which includes movement of the displayed image. It thus provides a combined display and input device with improved operational efficiency by minimizing operation errors, in which the operator can clearly recognize the operational input commands he has generated. Also, by displaying the required information step by step for the magnification alteration operation, it is possible to provide a combined display and input device which improves economy by preventing operation errors which may accompany the magnification alteration operation.

What is claimed is:

1. Information display and input apparatus for use with an image processing module having a plurality of operation modes including a size operation mode selectively providing one of enlargement and reduction of the size of an image, the apparatus comprising:

a display unit having a display surface defined by X,Y coordinates for displaying graphic display images associated with the operation modes;

an input unit having an input surface corresponding to the display surface and defined by the X,Y coordinates, the input unit being responsive to touch inputs at the input surface to generate electrical signals corresponding to the X,Y coordinates of the touch input;

a memory for storing a plurality of control programs including instructions defining the operation modes of the apparatus and defining predetermined X,Y coordinates of touch inputs associated with the size operation mode;

controller means connected to the display unit, the input unit, and the memory for responding to a touch input within the predetermined X,Y coordinates associated with the size operation mode and for executing instructions in the program corresponding to the size operation mode to sequentially generate a series of the graphic display images representing one of enlargement and reduction of the size of the image.

2. Apparatus as recited in claim 1 wherein the controller means comprises means for generating a first series of graphic display images comprising a sequence of a reduction image, a standard image, and an enlargement image when an enlargement of a picture image is specified by a touch input, and a second series of graphic display images comprising a sequence of an enlargement image, a standard image, and a reduction image when a reduction of a picture image is specified by a touch input.

3. Information display and input apparatus for use with an image processing module having a plurality of operation modes including a size operation mode selectively providing one of enlargement and reduction of the size of an image, the apparatus comprising:

a display unit having a display surface defined by X,Y coordinates for displaying graphic display images representing the size operation mode;

an input unit having an input surface corresponding to the display surface an defined by the X,Y coordinates, the input unit being responsive to touch inputs at the input surface to generate electrical signals corresponding to the X,Y coordinates of the touch input;

a memory for storing a plurality of control programs defining the operation modes of the apparatus and predetermined X,Y coordinates of touch inputs associated with the size operation mode and including instructions defining the graphic display images;

controller means connected to the display unit, the input unit, and the memory for responding to a touch input within the predetermined X,Y coordinates to sequentially generate a series of the graphic display images representing one of enlargement and reduction of the size of the image, and to generate a graphic display image representing the degree in which the size of the image is to be changed.

4. Apparatus as recited in claim 3 wherein the controller means comprises means for executing instructions in the program corresponding to the operation mode in which the size of an image is changed to generate a graphic display image simultaneously representing the relative sizes of the original image and the size to which the image is to be changed.

5. A method for generating control signals to an image processing module including a size operation mode selectively providing one of enlargement and reduction in the size of an image, comprising the steps of:

generating, on a display device, a graphic display image representing a command to execute the size generation mode;

receiving, on a touch panel superposed with the display device, a touch input requesting the size operation mode;

simultaneously generating control signals to the image processing module to change the size of the image and sequentially generating a series of graphic display images representing one of enlargement and reduction of the size of the image.

6. A method as recited in claim 5 in which the substep of generating a series of graphic display images comprises generating a first series of graphic display images comprising a sequence of a reduction image, a standard image, and an enlargement image when an enlargement of a picture image is specified by a touch input, and a second series of graphic display images comprising a sequence of an enlargement image, a standard image, and a reduction image when a reduction of a picture image is specified by a touch input.

7. A method for generating control signals to an image processing module including a size operation mode selectively providing one of enlargement and reduction in the size of an image, comprising the steps of:

generating, on a display device, a graphic display image representing a command to execute the size operation mode;

receiving, on a touch panel superposed with the display device, a touch input requesting the size operation mode; and simultaneously generating control signals to the image processing module to change the size of the image, sequentially generating a series of graphic display images representing one of enlargement and reduction of the size of the image, and generating a graphic display image representing the degree in which the size of the image is to be changed.

8. A method as recited in claim 7 in which the substep of generating a graphic display image representing the degree in which the size of the image is to be changed comprises generating a graphic display image simultaneously representing the relative sizes of the original image and the size to which the image is to be changed.

* * * * *